Jan. 26, 1943.     E. C. INGRAHAM     2,309,458
POULTRY CAGE APPARATUS
Filed Oct. 14, 1939     5 Sheets-Sheet 1

Inventor:
Elmer C. Ingraham
By Pike, Calver & Gray
Attorneys

Jan. 26, 1943.   E. C. INGRAHAM   2,309,458
POULTRY CAGE APPARATUS
Filed Oct. 14, 1939   5 Sheets-Sheet 3

Inventor
Elmer C. Ingraham
By Pike, Calver & Gray
Attorneys

Jan. 26, 1943.　　　　E. C. INGRAHAM　　　　2,309,458
POULTRY CAGE APPARATUS
Filed Oct. 14, 1939　　　　5 Sheets-Sheet 4

Inventor:
Elmer C. Ingraham
By Dike, Calver & Gray
Attorneys.

Jan. 26, 1943.    E. C. INGRAHAM    2,309,458
POULTRY CAGE APPARATUS
Filed Oct. 14, 1939    5 Sheets-Sheet 5

Inventor:
Elmer C. Ingraham
By Pike, Colner + Gray
Attorneys.

Patented Jan. 26, 1943

2,309,458

UNITED STATES PATENT OFFICE 2,309,458

POULTRY CAGE APPARATUS

Elmer C. Ingraham, Hampstead, N. H.

Application October 14, 1939, Serial No. 299,399½

4 Claims. (Cl. 119—48)

This invention relates to improvements in battery cages, to certain novel features of construction, combination and arrangement of the several parts.

The battery cages of the present invention are principally constructed for the housing and care of poultry, but may also be used to confine and provide for other occupants, such as small birds and animals. The following disclosures will be more precisely descriptive of a battery as used for laying hens, but this is not intended to narrow or limit the invention in any way.

It has recently been found that hens are better producers and better fitted for market when kept confined in cages during their entire productive life. When segregated in this manner it is a simple matter to determine which hens are productive and which not, and confinement improves the quality of the meat. This confinement and segregation have, however, raised a whole new set of problems for the owner. In order to care for a great number of hens properly, they must be caged in close proximity to each other. Such close housing may however lead to fighting among the occupants and the spreading of disease. The occupants must be watered and fed and kept clean without the necessity of removal from the cages and with as few motions and as little labor as possible, and it is, therefore, not expedient to care for the occupants as individuals. The watering, feeding and cleaning systems must be especially adapted to the batteries of cages and form as much a part of them as the floors and walls and egg collectors. The problem, in every instance, concerns the provision of a complete and satisfactory battery capable of housing and caring for the occupants, and no battery is satisfactory for practical purposes unless the several elements thereof are individually suitable and, taken together, capable of combining to form a workable, unitary, structure.

The batteries of the prior art have not satisfied these requirements. In some, the front closures have allowed one occupant to steal from or fight with another, and sometimes escape. Some have had drinking systems that became clogged, others a system that wasted water or tended to wet the occupants. Any of those defects renders the whole battery untenable, and previous attempts to overcome them have so greatly increased the cost of a battery that the whole system, desirable as it is, is in danger of discredit.

This invention has for its general object the provision of battery cages of minimum initial cost and so arranged and constructed that the poultry housed therein may be cared for in an efficient manner and at a minimum cost for attendance and maintenance. It is further an object to provide cages of very simple and durable construction equipped with clean and sanitary water systems and refuse removal systems.

The invention will be best understood from the following description in conjunction with the accompanying drawings. It is to be understood that the invention is not limited to the details of construction and arrangement of parts illustrated in the drawings, since the invention as defined by the claims hereinafter appended, may be otherwise embodied without departure from the spirit and scope thereof.

It is also to be understood that the terms here used are for the purpose of description and not of limitation, and it is not intended to limit the invention claimed herein beyond the requirements of the prior art.

Figure 1:
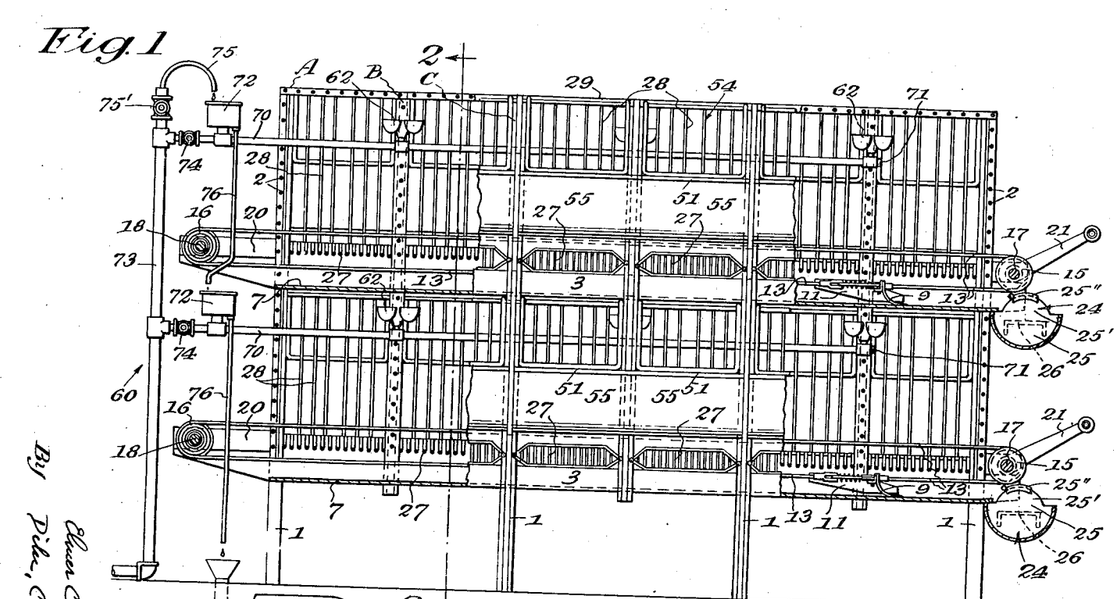
Fig. 1 is a view in front elevation of a complete battery embodying my invention partly in section.
Figure 4:
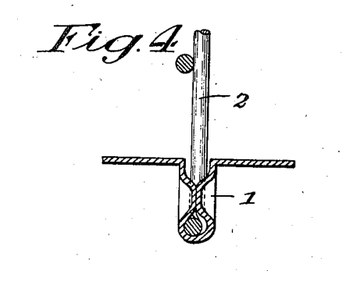
Fig. 4 is a detail view showing a post in cross section.

In the drawings, Fig. 1 shows a complete battery of cages generally denoted by the letter A. The frame of the battery comprises a series of upright sections B and C each having posts 1 and wire panels 2 joined as shown in Fig. 4. Since it is not necessary that each post 1 reach the floor, some posts are shorter and only intended to form panels, not legs. Sections B are thus different from sections C only in that the posts 1 of section B are not long enough to serve as legs, as in the sections C.

The panels 2 are available at very low cost by using for each a panel of electric-welded wire fabric known to the trade as lawn fencing, but especially prepared panels may be used if desired. Combining the panels 2 and the posts 1 to form the sections B and C is expedient and economical, the parts being placed in a jig and all locked securely together by a single operation of a press first along one post and then along the other as the jig is reversed. Spot-welding could doubtless be substituted for the press work described if suitable equipment were available without materially altering the construction described.

Figure 2:
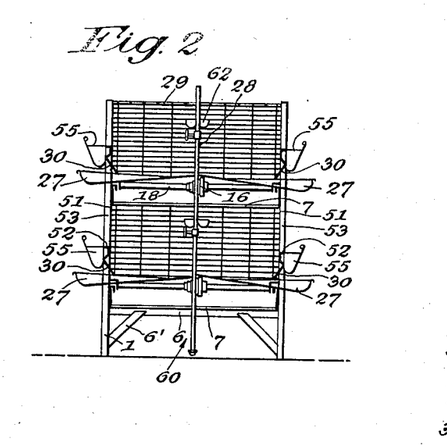
Fig. 2 is a vertical cross section on line 2—2 of Fig. 1.

The sections B and C are joined in spaced relation by longitudinally extending rails 3. The length of the rails and the number of the sections joined depends upon the size of the battery desired. The size may, of course, be varied at will. Angle irons 6 (see Fig. 2) serve to stiffen sections B and C and to support dropping pans 7. Braces 6', running diagonally between angle irons 6 and the leg portions of posts 1, may be added if increased rigidity is desired. Further braces 5 (Figs. 11 and 12) serve to reenforce the ends of the battery of cages.

The handling and disposal of droppings from hens in laying cages or from other poultry in cages has heretofore required much of the attendant's time and labor while leaving much to be desired in the way of cleanliness and sanitation. It has therefore been one of my objects to provide new means to meet this need, and to that end I have developed a new and superior scraper 8. (See Figs. 3 and 6 to 10 inclusive.)

Figures 6, 7:
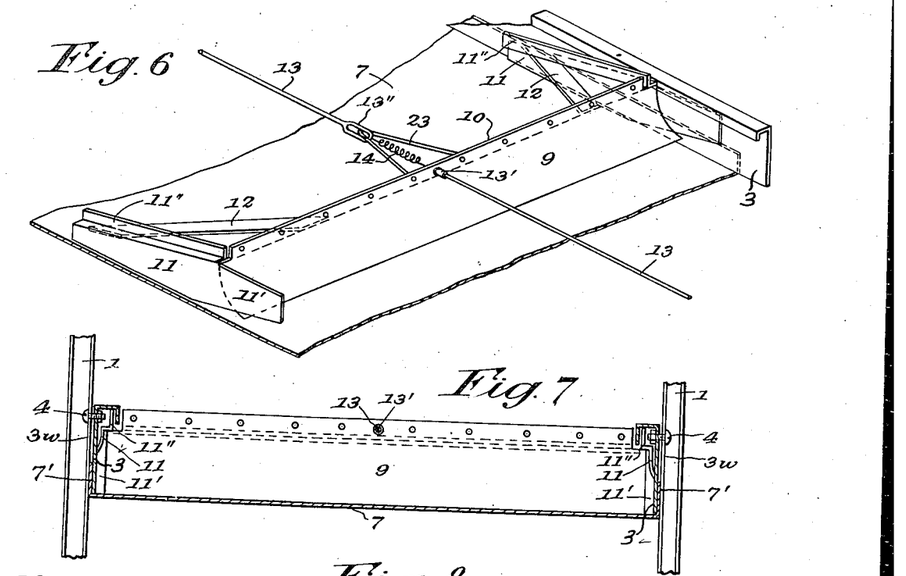
Fig. 6 is a view in perspective of a fragment of a dropping pan with scraper.
Fig. 7 is a cross sectional view of a pan, showing the scraper in front elevation.

The scraper 8 comprises a concavely curved blade 9 made of thin and springy metal which is mounted upon and carried by a frame comprising an angle bar 10 to the ends of which wings 11 are rigidly attached by welding at the juncture and by the brace members 12, the wings 11 forming scraping blade portions 11' to scrape the sides of the dropping pan and offset portions 11'' to clear the bolts 4, as clearly shown in Fig. 7.

The concave character of the blade 9 affords a number of desirable features. By its smooth roundness, having no angles, corners, or projecting parts, the contents of it have a marked tendency to slide off cleanly into a catching box provided at the end of the dropping pan, so that clean transfer is more easily effected and hand cleaning of the scraper is eliminated or greatly facilitated. The concavity of the blade brings its leading edge into engagement with the pan 7 at a very low angle as compared to others which causes the blade to slip underneath the contents of the pan and break the adhesion of such contents to the pan with superior ease and efficiency. Also this shape gives to the scraper capacity to pick up and carry a maximum quantity of material from the dropping pan and so permits the construction of desirably longer battery units.

In the arrangement shown the rails 3 form the practical sides of the dropping pan 7, being placed inside of its actual sides 7'. The length of the bar 10 is somewhat less than the width of the dropping pan between the rails 3, and the wings 11 and their scraper portions 11' spring outward to effect frictional contact with the rails 3 and are confined within and underneath the flanged upper portion 5 of the rails 3 as shown.

Metal sheets suitable for dropping pans are not leveled and can not be made to lie perfectly flat, therefore the bottom surface of a metal dropping pan which is theoretically a plane surface actually is never a plane surface but an uneven and wavy one, and this characteristic bears a relationship that varies approximately inversely as the thickness of the sheet. Therefore it has been necessary heretofore to use heavy sheets of metal for dropping pans in order to minimize that waviness, for the relative rigidity of scraper blades heretofore available has demanded a true surface for them to be able to clean it at all satisfactorily.

However, I have found my concavely curved, thin, and springy, scraper blade 9 entirely successful; held firmly along its top edge by the bar 10, its lower or leading edge is pressed into firm but yielding contact with the dropping pan 7 throughout its length, i. e., across the width of the pan 7, regardless of the pan's waviness, by the internal stresses in the metal of the blade 9 itself which, due to the curvature described, give to that leading edge an extreme springy and elastic flexibility that can not be had along the edge of similar metal in plane form. Thus as the scraper 8 is drawn through the length of the pan 7 the leading edge of the blade 9 presses down but yields and flexes to follow the changing contour of the pan's surface throughout, and efficiently and satisfactorily removes the contents. And I find this function so successfully performed that light sheets of extremely wavy character are entirely satisfactory for the dropping pans, with considerable resultant saving.

Scrapers available heretofore have been so restricted by their own structure or operating mechanism that they have been able to scrape out only somewhat less than the full width of the dropping pan in which they operate, resulting in an accumulation of unremoved droppings in the corners and along the sides which constitutes a nuisance. To overcome this disadvantage I have provided my scraper structure 8 with scraping members 11' carried in advance of the blade 9 and arranged to scrape any droppings off the sides and out of the corners of the pan, turning them inward so that the blade 9 will pick them up and remove them, and thereby I have removed and prevented the presence of such a nuisance. The scraping members 11' may be formed integral with the wings 11 of the scraper structure as shown, and they may assist in confining and guiding the structure within the rails 3.

Scrapers may be single acting, with a single scraping blade designed to clean in one direction only, or double acting, with two blades oppositely disposed designed to clean first in one direction and then in the other direction. Single acting scrapers however are generally preferable, especially in large installations of laying cages, because the droppings are always removed from the same end of the batteries and special facilities for carrying them out of the room can be arranged economically. It will be understood that while a scraper is being drawn through a dropping pan to clean it some droppings will fall into the pan behind the scraper; single acting scrapers heretofore available drag such droppings back to the opposite end of the pan as they are returned to their original position following the cleaning operation. Such droppings can not be removed from the pan by such a scraper, but accumulate behind the same and constitute a nuisance which it has been my object to overcome.

I have built scraper structures having the blade 9 so suspended within them that it has a limited pivotal movement on a horizontal axis above and back of the center, the structure being drawn by cables attached to the blade above the said axis so that when being drawn forward the blade's leading edge is pressed down in contact with the dropping pan surface, but when being drawn backward the blade rotates back on the said axis to its limit thereby lifting the leading edge clear above the dropping pan surface so that it passes back to the opposite end over such droppings and no nuisance accumulates behind it. (See Fig. 19.) The blade 9 is carried by the bar 10 within a frame comprising the bar 10a, wings 11a which form side-scraping portions 11'a, and braces 12, and off-set portions 11"a, by pins p passing through lugs L and La which are fixed respectively to the bars 10 and 10a, with the lug La forming stops to limit rotation of the blade parts in either direction.

While the scraper structure last described has proven eminently satisfactory in use, being very positive in action and reliable for the purposes described, I have found the simpler and therefore cheaper structure shown in Figs. 6 to 10 sufficiently so to be generally satisfactory in practice, and for that reason have preferred it. Here the bar 10 is rigidly fixed to the wings 11 which are similar to the wings 11a of the other structure except that they are tapered off rearwardly from a point adjacent the bar 10 as is clearly shown in Figs. 6, 8 and 9.

Thus the wings 11 form rockers, and the structure rocks forward or backward as it is drawn by the cable or cables due to the frictional resistance obtained between the wings 11 and the rails 3 being beneath the point at which the cables are attached. This rocking action is clearly shown in Figs. 8 and 9 where the structure is shown rocking forward and pressing the leading edge of the blade 9 in contact with the dropping pan 7 while being drawn forward, and rocking back to partially rotate the bar 10 and thereby lift the leading edge of the blade 9 clear above the pan 7 while being drawn back. The parts of the structure of Fig. 19 occupy similar relative positions while being drawn forward to those in Fig. 8, but when being drawn back only the blade 9 and bar 10 change to positions similar to those in Fig. 9.

Dropping pan scrapers have heretofore been drawn through the pans by ropes pulled hand-over-hand by the attendant, which is cheap but distasteful, inefficient and laborious; by cables and windlasses at opposite ends operated by the attendant, which require much time, labor, and footwork, on his part; and by link-chain-and-sprocket mechanisms operated manually by the attendant, which are undesirably expensive to manufacture and troublesome in use by reason of their many parts and complicated nature. Efforts to apply power to the operation of such scrapers have heretofore proven generally unsuccessful due to the general unsuitability for power of operating mechanisms designed for manual operation. The need for a scraper operating mechanism economical to manufacture, rapid and efficient for manual operation, and safe and suitable for the application of power, has been apparent; and it has been my object to provide such mechanism.

Figures 8, 9:
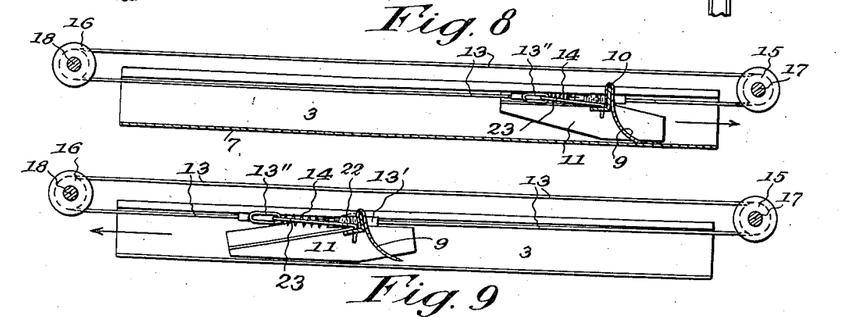
Fig. 8 is a diagrammatic view showing scraper in forward motion.
Fig. 9 is a diagrammatic view showing scraper in backward motion.
Figure 10:
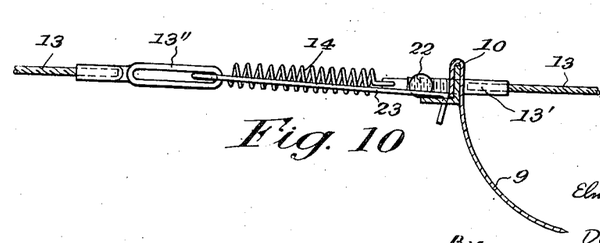
Fig. 10 is an enlarged detail view of scraper mechanism.

To that end I have provided the operating mechanism here shown, comprising a cable 13, see Figs. 6, 8 and 9, passing under and two full turns around in a single groove of a traction sheave 15 fixed upon a shaft 17 journaled in shaft-hangers 19 and adapted to engage and be turned by a handcrank 21; thence to the opposite end of the battery and over an idle sheave 16 mounted freely upon the shaft 18 fixed in the hangers 20, and thence back towards the starting point. The ends of the cable 13 have terminals 13' and 13" by which they are connected together by the spring 14, and by which they are adapted to engage the bar 10 of the scraper structure 8 through means of the lug 22 and the yoke 23 respectively.

The traction sheave 15 is grooved to keep the cable 13 running in the battery's center at all times, and fixed upon the shaft 17. It will be understood that when the sheave 15 is turned to transmit power to the cable that the wraps of cable about it try to run to one side or the other. In doing so they have to climb up the rounded sides of the groove and thereby have to take up more of the length of the cable in the wraps around the larger diameter away from the center of the groove, thereby stretching the spring 14 which connects the ends of the cable together and so increasing its tension with result that it pulls the cable ends together thereby shortening the length of cable occupied in wraps around the sheave thereby forcing them to slip back down towards the center of the groove. This action takes place continuously when the cable is being drawn in either direction by turning the sheave and may be observed in practice in the constant play of the spring as it alternately draws and stretches.

The end terminal 13' of the cable 13 is shown as passing through, and carrying the lug 22 back of, the scraper bar 10, while the other end terminal 13" is shown as having an elongated eye through which the yoke 23 which is attached to the bar 10 passes. Now when the sheave 15 is turned counterclockwise the lug 22 will engage the bar 10 to draw the scraper forward, and when reversed the eye of the end terminal 13" will engage the yoke 23 and thereby draw the scraper back. It is seen that in either case the tight end of the cable draws the scraper while the spring merely keeps up the loose end.

In practice the cable 13 stretches somewhat with use so that its length requires occasional adjustment to preserve the proper tension on the spring 14. To render such adjustment quickly and easily possible I have provided the special idle sheave 16 which is stepped to provide several grooves of different diameters in any one of which the cable 13 may run. The sheave 16 being journaled freely upon the shaft 18 permits the cable 13 to find the center where it stays by reason of its own tension; when the cable requires adjustment the attendant merely runs it up onto the next higher step of the sheave 16 which then moves over a little so that the cable continues to run in the center.

The shaft-hangers 19 and 20 act as stops against which the scraper 8 engages to limit forward and backward movement. If an attendant chooses to force the crank 21 beyond the point at which movement of the scraper is arrested the traction sheave 15 merely slips within the wraps of the cable 13 and no damage is done to any part of the mechanism. This feature is intentional; it renders the application of other than manual power safe and feasible.

The shaft-hangers 19 and 20 are fixed to the end-most posts 1 and form continuations of the side-parts 3 and 7' of the dropping pans 7. The hangers 19 form hooks 19'', see Fig. 11, adapted to receive and support a catching-box 24; the lower edges of the hangers 20 serve as tracks to carry and confine the wings 11a or 11 of the scraper structure 8.

It will be seen that my entire scraper operating mechanism is clean, and positive and efficient in operation; the attendant having only to apply the crank 21 to any shaft 17 and turn it one way to clean out the corresponding dropping pan and then turn it the other way to return the scraper to its starting point at the opposite end. It will be seen too that the entire mechanism is economical to manufacture, consisting of but few simple parts, and that it is not subject to damage by abuses and is therefore suitable for the application of other than manual power.

Droppings from the pans of batteries are received from the ends of the dropping pans or other dropping-receiving means employed in the batteries in receptacles commonly known as catching-boxes. Such catching-boxes have heretofore been of the simplest rectangular design and usually supported below and merely somewhere in the vicinity of the end of the pan but without any definite relationship to it, the droppings being expected to fall into it when brought to the end of the battery. In practice such catching-boxes have revealed many faults and unpleasant features viz. some of the droppings having a tendency to fall outside instead of inside, some have a tendency to spill part of their contents, particularly liquid matter, and they are not too easy to empty or to clean by reason of their many corners and angles, and they are awkward, inconvenient, and dirty, to handle.

Figure 3:
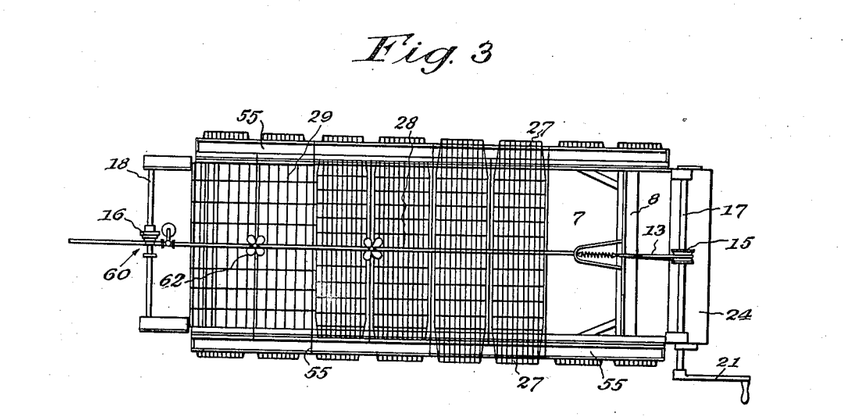
Fig. 3 is a top plan view partially in section.
Figures 11, 12, 19:
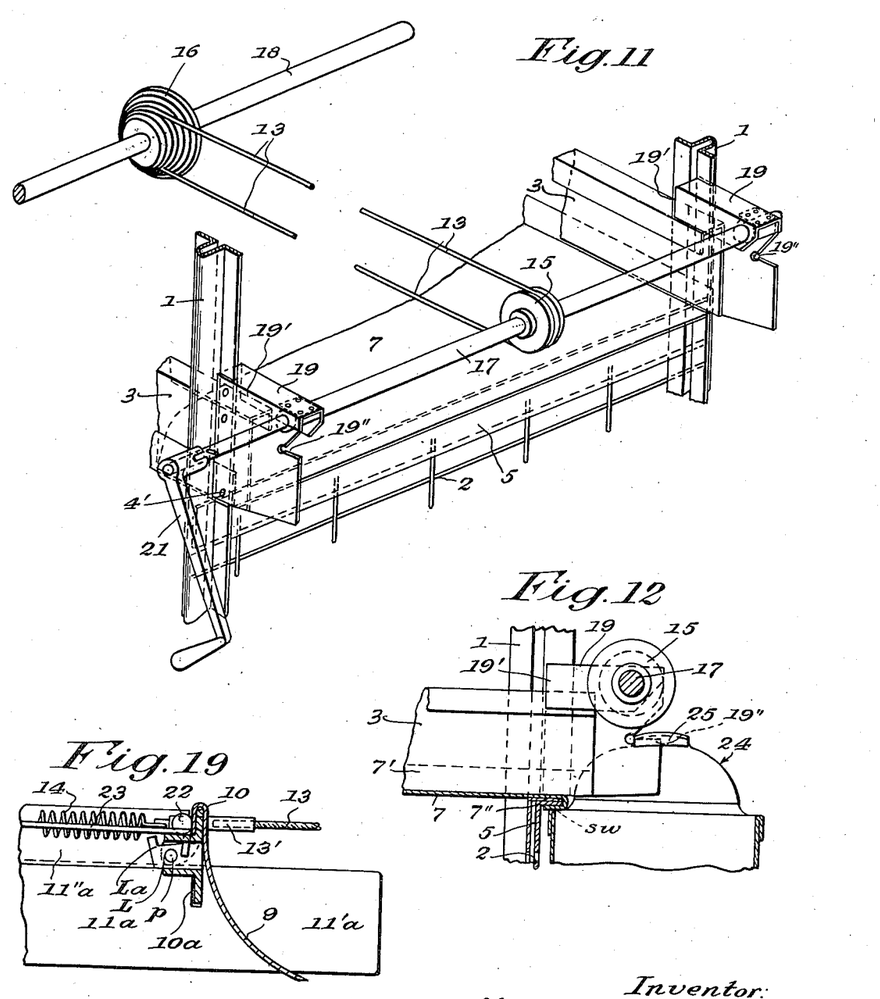
Fig. 11 is a fragmentary perspective view of scraper operating mechanism.
Fig. 12 is a fragmentary view in cross section showing catching-box and dropping pan.
Fig. 19 is a fragmentary sectional view of modified form of scraper.

It has been my object to overcome these faults and to do so I have provided the novel catching-box 24 illustrated in Figs. 1, 3 and 12. The body of this box 24 is formed rounded as shown having no corners and no angles lengthwise of it; it is provided with ends 25 which form portions 25' extending higher than the sides and which in turn form hooks 25'', the portions 25' being adapted to fit over and outside of the shaft-hangers 19 which form extensions of the sides of the dropping pan, and the hook portions 25'' being adapted to fit over and be engaged by the hook portions 19'' of the hangers 19, while the end pieces 25 and the side of the box formed by the body 24 are adapted to fit closely in underneath the end 7'' of the dropping pan 7.

It will be seen in Figs. 1 and 12 that the hook portion 25'' engages the hook portion 19'' at a point well off-center of the catching-box, whereby the catching-box may swing into the position shown, as indicated by the dotted line sw, affording easy engagement and rapid handling of the catching-box for one thing, and whereby the weight of the catching-box and of its contents serves to press the side of it upward underneath and into close engagement with the end 7'' of the dropping pan 7.

Convenient carrying handles 26 are attached to the opposite ends 25 of the catching-box, and the portions 25' extending above the sides of the box and above the handles 26 protect the said handles to keep them clean and also serve as shields which prevent the attendant's hands from coming into contact with contents of the catching-box.

In practice this catching-box acquires such novel relationship with the dropping pan that all extending parts of the said pan, as well as the extending parts of the scraper 8 in extreme forward position, are confined within or between its end portions 25', resulting in absolutely clean transfer of contents from pan to catching-box and not a drop or a crumb is spilled. Following such transfer the attendant takes the catching-box by its two handles and turns its contents into a wheelbarrow, litter carrier, or other suitable receptacle, and here again a clean transfer is easily effected for the contents of the rounded box tend to slip out in a single mass because no angles or corners resist such movement. Moreover, his hands are kept clean and free from contact with any of the contents of the box by its shielding extended end portions. Thus his work is considerably expedited and made more pleasurable, and an important nuisance of spilled droppings is averted.

It is desirable to be able to hose dropping pans of batteries out with water under pressure, a function which equipment heretofore available has permitted not at all or badly, and which it has been my object to permit and provide for. The catching-box described may be attached to any dropping pan as described above and water hosed into the pan from the opposite end; so perfect are the relationships described that the catching-box will receive and retain what runs out of the pan, and the scraper may be drawn through the pan to bring out the rest and the box will receive and retain it without spillage. This function will prove of especial value when need rises to disinfect any battery; in such a case the pans may be washed out as described and then liquid disinfectant sprayed, pumped, or poured into them, and the scraper will remove the excess which will be received and retained by the catching-box without loss so that it may be used over again.

Above the dropping pans I employ wire mesh floors 27 to support the occupants. Those shown are of common design and construction and are supported in place as shown by common means, they slope from the center of the battery outwards and extend beyond the posts 1 of the structure forming receptacles to receive and retain eggs at their extremities.

Between the panels 2 and above the wire floors 27 I insert smaller wire mesh panels 28 attached to the panels 2 by common means, which divide the compartments formed between the panels 2 into individual cages facing outward to the sides of the battery. Over the top of the entire battery I have placed a larger panel of wire mesh 29 secured in place by any convenient means to form a top for the individual cages of the upper deck; it will of course be understood that the dropping pans form the tops of the cages of the lower decks.

Some hens in cages will break and eat eggs if they can get at them, and it has been my object to provide front closures that will prevent their doing so. Some front closures heretofore used have consisted in part of feed pans which when removed for cleaning permit the occupants to escape from their cages, and it has been my object to provide closures independent of the feed pans. Some closures heretofore used have required intricate fastenings costly to manufacture and in practice inconvenient to open and close, and it has been my object to provide closures of low cost and without any inconvenient fastenings. Some closures previously used have permitted occupants to displace or unfasten them accidentally and so escape, and it has been my object to provide closures that can not be displaced or unfastened by the occupants.

To the first object stated above I have provided a horizontal wire rod 51, see Fig. 14, extending continuously through the channel-forming parts of the several posts 1 a certain distance below the tops of the individual cages; this wire forms a part of the front closures and prevents hens from attacking eggs lying on the front portions of the wire floors 27 above them by catching them under their throats if they try to reach out over it and catching the backs of their necks if they try to reach out and up underneath it.

A similar wire rod 52 extending similarly through the posts 1 a certain distance above the bottoms of the individual cages forms a further part of my front closures, and closure plates 30 for each individual cage are attached thereto. The closure plate 30 when in place forms an inclined plane 30' commonly known as a dropping guard whose purpose is to prevent any droppings from falling outside of the dropping pan beneath, and provides a heel portion 30'' which engages against the feed pan to maintain the inclination of the dropping guard as shown, a hook-forming portion 30b to engage over the wire 52 and whose corner-portions 30b' are bent inward underneath the wire 52 to attach the plate 30 thereto, and preferably also a vertical plane portion 30c to engage within the hook-portion of the feed pan when the latter is in place as in Fig. 5. It will of course be understood that when a hen drops an egg it promptly rolls down the inclined floor and underneath the dropping guard and feed pan, and so beyond her reach.

The space beneath the wire 52 is sufficient to insert or remove a full-grown hen; and when the feed pan is removed the plates 30 hanging on the wire 52 close this space but may be turned outward and upward by the attendant to open it to insert or remove an occupant. One or more wire rods 53 similar to the wires 51 and 52, may be similarly passed through the posts 1, sufficiently closing the space between the wires 51 and 52 to confine the occupants within the cages while allowing them access to the feed pans as shown, and by this means the most economical satisfactory complete front closures are obtained.

Some hens are extremely thrifty and will reach to either side for feed, robbing the adjoining occupants, in preference to eating that which is placed in front of them; some are extremely active and will slide their necks along the edge of the feed pan till they wear the feathers off; some are highly nervous and may injure their combs on the wire 53; some are mean and will pick at or pull feathers from the exposed head and neck of an adjoining occupant. For such cases, I have devised front closure means adapted to engage other parts of the front portions of the cages in such a way that the attendant is able to engage or disengage them instantly but at the same time in such a way that occupants of the cages could not disturb or disengage them. To that end I have provided the novel vertical center-feeding fronts illustrated in Fig. 14; these may be substituted for the wire 53, other elements of front closures previously described remaining unaltered. My novel vertical front comprises an outer frame forming offset open hooks 54h at its upper corners as shown and consisting of two wires 54, 54', formed and joined as shown by weld, two vertical wires 54'' spaced apart to permit feeding between them and offset to correspond to the frame part 54 and preferably centrally disposed as shown, and other vertical wires 54''' similarly offset disposed between the wires 54'' and the frame part 54 and spaced apart but preferably closely to prevent feeding between them. The lower ends of the vertical wires 54'' and 54''' join to the frame wire 54 preferably by butt-weld as shown whereby the lower portion of the front is made smooth and without projections and is of no greater thickness than the wire 54, and the upper ends of the said wires join to the frame wire 54' by an usual overlying welded joint as shown.

Figure 14:
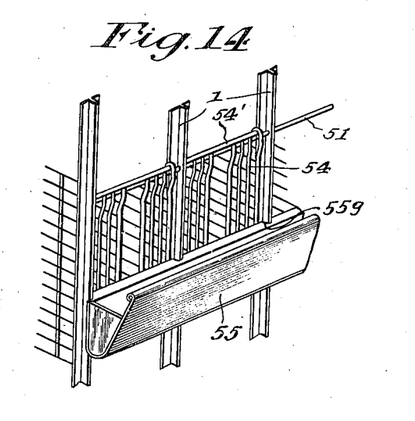
Fig. 14 is a fragmentary perspective view of a modified form of cage front.
Figure 14A:
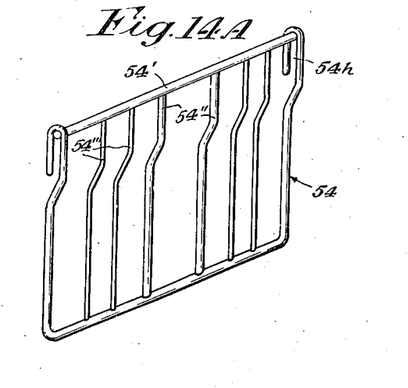
Fig. 14a is a perspective view of cage front gate.
Figure 15:
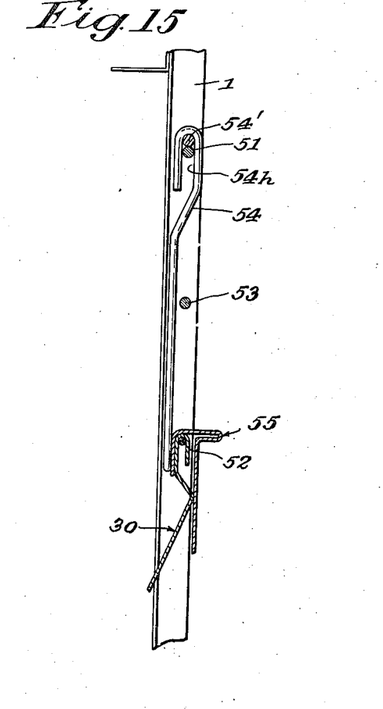
Fig. 15 is a view in cross section of the cage front of Fig. 14 in cooperative relationship with a closure plate and feeding tray.

This front goes in place as seen in Fig. 14, the open hooks 54h engaging over the wire 51, and the said hooks with other vertical portions of the frame 54 fitting within the angles formed between the wing-forming portions and the channel-forming portions of the posts 1, and the lower extremity fitting back of the wire 52 and the closure plate 30 and the hook portion of the feed which engage over the said wire 52 as elsewhere described, and between these parts and the said wing portions of the posts 1 as shown in Fig. 15. The wire 51 is retained for the protection of the egg above as previously explained.

Thus the front described is securely held in place without any intricate fastenings and in such a manner that the occupant of the cage cannot displace or open it to escape therefrom, and it in no way alters or interferes with the uses of the closure plate or feed pan as elsewhere described. Yet the attendant can remove or replace it instantly with one hand for access to the interior or to remove or insert an occupant without disturbing the feed pan, thus constituting a valuable improvement over other vertical fronts which generally require more time.

A further novel and valuable utility of this novel front is seen in the fact that the presence of the wire 53 does not prevent or interfere with its application or removal, as may be seen in Fig. 15 where the wire 53 is shown present. Thus batteries of cages may be equipped with horizontal fronts for the economy and other desirable features thereof, and then certain individual occupants whose unusual activities are such as to demand further restriction may be so restricted by the application of additional vertical fronts, and if desired an entire deck can be converted to vertical fronts at any time, and a single battery may have horizontal, vertical, and combination fronts all at once. The value of new convenience in the ability to change from one to another in a few moments time and without disturbing the occupants will be at once apparent.

The holes provided in my structure for the horizontal front-forming wires extend right through both sides of the channels of all intermediate posts 1, but only through the inner side of the channel of the end posts, thus providing blind holes adapted to receive the ends only of the said horizontal wires, which are cut to exact length and sprung into place. Hence there are no projecting ends and the front-forming wires may be sprung out and removed without difficulty at any time. Applying the features of my novel front construction to structures other than shown in the drawings and described herewith, I may add channelled members or other equivalent to the structures to afford blind holes for the retention of horizontal front wires substantially as described.

Figure 5:
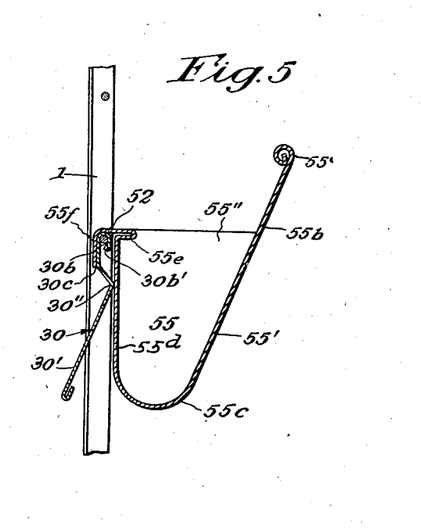
Fig. 5 is an enlarged fragmentary portion of Fig. 2 showing construction of feed tray and closure plate.
Figure 13:
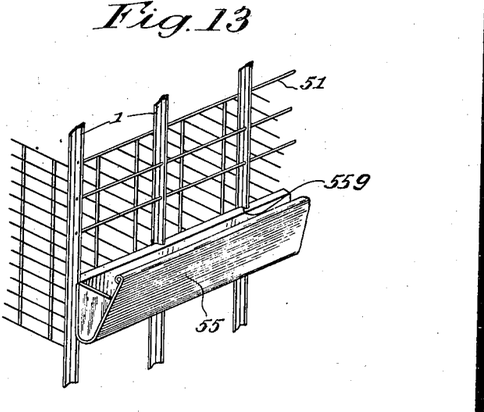
Fig. 13 is a fragmentary perspective view of a cage front.

My novel feed pan 55 is illustrated in Fig. 5. This pan is constructed of sheet metal comprising a body 55′ with two ends 55″ seamed or otherwise, suitably attached thereto. The body 55′ formed as shown has a sloping plane front side portion 55b; a rounded bottom portion 55c which forms no corner or angle lengthwise of the pan; a double-folded shelf portion 55e extending inwardly of the pan; and a hook-forming portion 55f adapted to engage over the wire 52 and the plate 30 engaged thereon and to engage the portion 30c of the said plate 30, and adapted by the notches 55g to give clearance to the channel portions of the posts 1 (see also Fig. 13).

The inwardly turned bead or roll 55a and the shelf 55e serve the purpose of preventing the occupants of the cages from wasting feed by billing it over the sides of the feed pan. Structurally the roll 55a makes the pan much stiffer and stronger; structurally also the round bottom 55c is stronger and less liable to mechanical injury in use. The round bottom is better because it makes for easy cleaning and provides no angles in which feed tends to stick and sour. The pans are made of such length as to extend across the fronts of a convenient number of cages from center to center of the posts 1, and thus different pans abut closely together to form a continuous extent across the length of the battery so that feed is not wasted by being billed over the ends of the several pans by the occupants of the cages.

It has been my object to provide a watering system for batteries of cages that will be reasonably economical to manufacture and which will assure the provision of an ample supply of drinking water and assure its being reasonably fresh and pure, which will waste a minimum quantity of water, and which will be essentially self cleaning in practice to minimize the attendant's labor in connection therewith.

Figure 16:
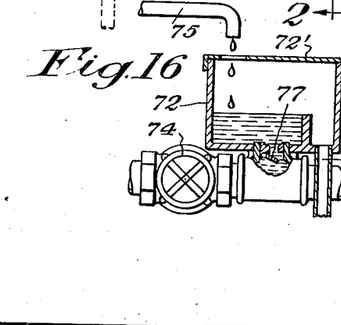
Fig. 16 is a fragmentary elevational view partly in section of a part of the water supply system.
Figure 17:
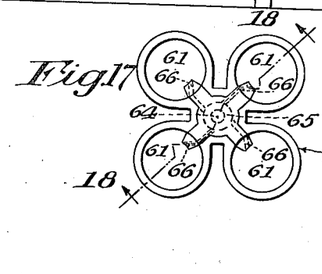
Fig. 17 is a top plan view of drinking unit.
Figure 18:
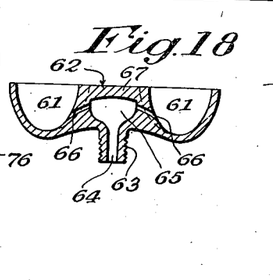
Fig. 18 is a view in cross section of a drinking unit on line 18—18 of Fig. 17.

To that end I have provided the water system 60, (see Figs. 1, 16 and 17). The system has individual drinking cups for the occupants of the several cages, with means for supplying water of assured freshness and purity to fill them and to replace that which the occupants remove therefrom, together with means for cleaning them hydraulically, by the introduction of water under pressure. I have found experimentally that I can get satisfactory results in cups varying considerably in shape and with considerable variation as to the point and angle and direction of incidence of a stream of water directed into them. At this time however I prefer a round cup shaped quite like the half of an egg, and I prefer to introduce the cleansing stream of water through the side wall of the cup and in such a direction that it may be described as angularly and downwardly, or tangentially. With the right relationships a thin stream of water so introduced will be caused by its own force to conform to the sides of the cup and to turn or spin around them with force to scrub them clean and to pick up and throw out any sediment of any nature that may be lying herein.

An individual cup is provided for each occupant of the battery; to facilitate construction. I prefer to combine four cups into a dispensing unit that can be placed in the intersection of four cages, so that one cup will extend into each and so that no cup will be accessible to any other than the occupant for which it is intended. These devices could be made in a number of different ways, but I have preferred to show them as a die-cast or molded plastic product. Structurally the device as represented comprises a body 62 forming the four cups 61 and forming also a stem portion 63 which affords a central bore 64 and larger central chamber 65, the stem portion 63 being adapted by a standard pipe thread for attachment to a pipe line with which it is to communicate, and a complementary portion 67 pressed into the first portion 62 to complete the form of the four cups 61 and to cap the chamber 65 and to afford the restricted ports 66 from the chamber 65 into the cups 61. These dispensing devices are placed in the common corner of each group of four cages in the battery, and high enough so that the occupants of the cages cannot themselves foul them.

My watering system has horizontal pipes 70 for each deck in the battery carrying and communicating with dispensing units 62 disposed as described. Each pipe 70 carries and communicates also with a reservoir 72, and is in operable communication with a source of supply of water under pressure 73 through a valve 74. An adjustable metering valve 75′ is adjusted to supply water at a desired rate into the uppermost reservoir 72 from the source 73, and preferably this is arranged to be visible so that the attendant can judge at a glance what quantity of water is flowing. Each reservoir is provided with means for fixing the level of water therein at a predetermined point as by the overflow means 76; when water from the valve 75′ delivered to the reservoir through the pipe 75 has filled the pipe 70 and the cups thereon to the desired level, it overflows through the outlet 76 and is conducted into the reservoir 72 next beneath, where the same process is repeated and from which overflow is conducted to the next lower reservoir, the overflow from the last being conducted to a waste connection and this last is also preferably visible so that the attendant can judge at a glance the proper adjustment of the valve 75 to assure ample water supply to the occupants of the cages and at the same time to waste a minimum quantity of water.

It will be understood that in the distribution of drinking water each pipe 70 with its dispensers and reservoir constitutes a simple constant leveling system; when water is dispensed from any cup fresh water comes into it from the reservoir to replace that removed. There are however, a number of important considerations involved here which make various proportions and capacities in the system of the greatest importance.

The requirement for an ample supply of water for all occupants of the cages dictates that the reservoir 72 be full to the predetermined level at all times; this means that water must be supplied to each reservoir at least as rapidly as the occupants will under any normal condition dispense it from the cups. Thus under the control of the attendant, only the excess of water supplied over what the occupants of the lower deck will use is wasted, which will not usually be an important quantity. Of course if it is so desired a separate metering valve can be arranged to supply water from the source to each reservoir directly, and the overflow from each be conducted directly to the waste, which will make the minimum waste of water from each battery three times what it must be with the arrangement shown.

The requirement for freshness of the water supplied to the occupants of the cages dictates that fresh water be supplied to the reservoirs and thence to the pipes 70, and that the cups 61 be small and proportioned to the individual consumption of water by one hen, so that what small quantity of water is in the cup will be taken while still fresh and replaced with other still fresher from the reservoir.

The requirement for purity of the water supplied introduces more involved and more exacting requirements, dictating first of course that only pure water must be supplied to the reservoirs, and second that there must be no flow of water from one cup to another. I have satisfied this requirement by providing that hydrostatic pressure within the communicating pipes and passages and more particularly in the regions adjacent the ports 66 which communicate with the cups will never be lower than that in the cups outside of the communicating parts and the ports 66. Water must be supplied into the reservoir 72 in quantity to maintain the predetermined level therein without fail, which means practically that it must be constantly overflowing; the port or area of communication between the reservoir 72 and the pipe 70, and the pipe 70 itself, must be wide and free as possible of frictional resistance to movement of water; the bore 64 in the dispenser 62 must be as wide and free as feasible; the ports 66 must be as small and restricted as reasonably possible; and their inner ends by which they communicate with the bore 64 must be as widely separated as possible so that each may have a region adjacent it which is not adjacent to any other, which introduces the chamber 65 and explains the reason for its presence. The requirement for purity dictates also that the port by which water is supplied to a cup must be above the bottom of the cup and preferably downwardly disposed into the cup, so that possible foreign matter in the cup can not sink into the port or through the port into the communicating pipes.

With the parts arranged and proportioned in view of the requirements stated, frictional resistance to movement of water through the communicating pipes and passages as compared to that of maximum flow through any one port 66 into a cup 61 becomes so small as to be of no significance and for all practical purposes negligible. With these conditions and relationships it therefore becomes apparent that when water is dispensed from any cup whereby hydrostatic pressure is lowered therein so that flow of water is induced from the communicating piping through a port 66 into that cup it is so slight and water flows so freely through the piping to the region adjacent that port that hydrostatic pressures in the regions adjacent to other ports are not at all altered or affected, and so it is seen that under all normal circumstances there will be no flow of water from any cup into the system. Hence there can be no admixture, and the purity of the drinking water is assured.

Hydraulically cleaning the system requires the addition of means for introducing water under pressure to the pipes 70, and this may be made possible and unwanted loss of water prevented by the check-valves 77 placed in the port of communication between the pipes 70 and the reservoirs 72 as shown. These are gravity-open, so do not interfere with other functions previously described, but close against pressure from underneath. Now whenever the attendant wishes he can partly open the valve 74 which will admit water to the pipe 70 and force it out through the several ports 66 into the cups 61; under slight pressure this will flush the cups and float out such loose foreign matter as may be in them, under increased pressure obtained by more fully opening the valve 74 the stream directed into each cup by the port 66 becomes forceful and will clean the interior surfaces of the cup thoroughly in a very short while, escaping over the sides of the cups in finely broken sprays. Either operation is under the attendant's control and may be prolonged or cut short as he desires. Actually it requires but a few seconds of time to clean all the cups of an entire battery, and uses but a small quantity of water which falls harmlessly into the dropping pans and may actually facilitate the removal of the droppings from the pans. The occupants of the cages readily become accustomed to it and it does them no harm.

Periodically as desired the pipes 70 are conveniently flushed out with water admitted by the valves 74 after removal of the plugs 71, and water thus used may be received conveniently in the catching-box previously described for disposal. If desired the pipes 70 may be cleaned mechanically by rodding with a suitable brush before replacing the plugs 71. Loose covers 72' for the reservoirs 72 may be removed and the said reservoirs cleaned with a brush or other convenient means at the same time. These operations are required only occasionally, and an attendant caring for a large number of cages will carry them out for one or two batteries daily, whereby they will easily fit into daily routine and not accumulate into a troublesome chore.

From the foregoing description of my superior laying battery and of the many improved and novel features incorporated therein it will be seen that I have provided an improved poultry cage economical to manufacture and of great value and equally suitable alike to the cage user who wishes only to operate a small plant and care for it with ease and efficiency, to the user who wishes to begin small and add to his plant until he has the largest that one attendant can operate, and to the user who wishes to operate a large plant and is dependent upon hired labor.

I claim:

1. In a row of cages, a cleaning system comprising a source of water supply, a series of fountains, means for introducing water to said fountains under pressure with a downwardly directed tangential movement such that the water is swirled rapidly about and sprayed over the walls of the fountains, a pan underneath said fountains adapted to receive the water, a catching box having its inner edge placed in close association with the adjacent edge of said pan, a scraper adapted to move the water from said pan to said catching box and means for moving said scraper.

2. In a row of cages, a cleaning system having a source of water supply, a pan adapted to receive the water, a catching box adapted to receive the water from the pan, means for scraping said pan comprising a long thin flexible concave scraping blade and rockable runners associated with the sides of said blade and adapted to scrape the sides of said pan, guides for said runners, and means for reciprocably moving and rocking said runners comprising a traction sheave on one end of said row of cages, a pulley on the other end of said row of cages, a cable about said traction sheave and pulley, a terminal fastened with one end to said cable and movably associated with said scraping blade, a stop on said terminal adapted to limit its movement, and a spring adapted to prevent sagging of the cable.

3. In a row of cages, a cleaning system having a pan extending beneath and longitudinally of said row of cages, a catching box pivoted eccentrically at one end of said row of cages so that its weight forces an inner edge thereof tightly against the adjacent edge of said pan, a long thin, concave flexible scraper blade for said pan, rockable runners attached to the sides of said scraper blade and adapted to scrape the side walls of said pan, guides for said runners, means for moving said scraper blade to and from said catching box, and means for rocking said runners to elevate said blade during reverse movement.

4. In a cage, a water system comprising a drinking cup having an inner oval-like surface about a substantially vertical axis and a downwardly slanting duct merging above the bottom of the cup into the latter substantially tangentially of said surface so that a water stream issuing from said duct will flow along said surface downwardly toward said bottom in a swirl about said axis, and means providing communication between said duct and a water supply.

ELMER C. INGRAHAM.